(12) United States Patent
Wentworth et al.

(10) Patent No.: US 8,512,835 B2
(45) Date of Patent: Aug. 20, 2013

(54) PROTECTIVE BEAM COVERING

(75) Inventors: Robert J. Wentworth, Farmington Hills, MI (US); J. Allan Lunk, Howell, MI (US)

(73) Assignee: Motor City Wash Works, Inc., Northville, MI (US)

(*) Notice: Subject to any disclaimer, the term of this patent is extended or adjusted under 35 U.S.C. 154(b) by 690 days.

(21) Appl. No.: 12/538,199

(22) Filed: Aug. 10, 2009

(65) Prior Publication Data

US 2011/0033652 A1   Feb. 10, 2011

(51) Int. Cl.
*B62D 63/04* (2006.01)
*E04F 13/07* (2006.01)
*B62D 65/14* (2006.01)

(52) U.S. Cl.
USPC ............ 428/35.7; 206/335; 426/87; 198/618; 134/123; 134/165; 134/167 R; 134/122 R; 248/222.12; 52/650.1; 52/314; 428/34.9; 428/36.9; 428/35.2

(58) Field of Classification Search
USPC .......... 206/335; 426/87; 198/618; 134/123, 134/165, 167 R, 122 R; 248/222.12; 52/650.1, 52/314; 428/35.7, 34.9, 36.9, 35.2
See application file for complete search history.

(56) References Cited

U.S. PATENT DOCUMENTS

| 4,671,833 | A  | * | 6/1987 | Bradford et al. | 156/86 |
| 2003/0111099 | A1 | * | 6/2003 | Anderson | 134/113 |
| 2008/0299263 | A1 | * | 12/2008 | Piotrowski et al. | 426/87 |

* cited by examiner

*Primary Examiner* — Ellen S Raudenbush
(74) *Attorney, Agent, or Firm* — Quinn Law Group, PLLC

(57) ABSTRACT

A vehicle wash system having a plurality of vehicle treatment components with one of the plurality of vehicle treatment components including at least one support member. The at least one support member has an exterior surface. A shrinkable sleeve is sized to fit over the exterior surface of the at least one support member. The shrinkable sleeve is slid onto the at least one support member and located in a predetermined position around the exterior surface. Upon application of heat to the shrinkable sleeve, it shrinks and conforms to the shape of the exterior surface of the at least one support member such that it is fixedly attached to the exterior surface of the at least one support member in the predetermined position. The result is a protective covering for the support member that is durable and readily cleanable such that fluid and debris can be easily wiped off of the covering and corrosion of the support member is minimized.

16 Claims, 2 Drawing Sheets

PROTECTIVE BEAM COVERING

BACKGROUND OF THE INVENTION

1. Field of the Invention

The present invention relates generally to a durable covering for various structural components of a vehicle wash system that provides protection from corrosion and can be easily cleaned.

2. Description of the Prior Art

It is well known in the prior art to have support members for equipment or components in a vehicle wash system that are colored, such as for branding purposes. Existing ways for coloring the equipment of the components of a vehicle wash system include painting or otherwise coloring the components before installation. Each of these processes is labor intensive and time consuming. They also increase the cost of the equipment and can have limited durability.

Additionally, it is known that the vehicle washing process creates a harsh environment for the various components utilized in the vehicle washing system. The components in the vehicle wash system are regularly coated with water soap, wax, and/or various other chemicals, not to mention dirt from the vehicles that are the subjects of the vehicle washing process. These can all adhere to various surfaces of the components, making the facility look unclean. Additionally, regular contact with these fluids and other debris can also cause corrosion of the components that are typically constructed of a metal material. In an effort to combat potential corrosion, various vehicle wash facilities or manufacturers of vehicle washing equipment powder coat the support members of many components of the vehicle washing system in an effort to increase their durability. The components are then painted to improve the aesthetics, as discussed above. However, the painted support members are difficult to clean as the fluid and debris tends to adhere or stick to their surfaces. Additionally, because of the corrosive environment that exists in vehicle washing facilities, the paint on the support members tends to chip, wear, bubble and/or peal or the color can fade, which also requires repainting. These are all disadvantageous for the reasons discussed above.

As such, it is desirable to have an improved vehicle wash system that is aesthetically pleasing, cost efficient, easy to clean, and durable.

SUMMARY OF THE INVENTION AND ADVANTAGES

It is therefore an advantage of the present invention to provide a protective covering for a structural component of a vehicle wash system that is extremely durable.

It is another advantage of the present invention to provide a protective covering for a structural component of a vehicle wash system that will not peel or bubble like prior coverings or coatings.

It is still another advantage of the present invention to provide a protective covering for a structural component of a vehicle wash system that can be easily cleaned.

It is a further advantage of the present invention to provide a protective covering for a structural component of a vehicle wash system that can be easily applied over components having a non-uniform exterior surface configuration.

It is yet another advantage of the present invention to provide a protective covering for a structural component of a vehicle wash system that enhances the aesthetic appearance of the components.

It is still a further advantage of the present invention to provide a protective covering for the various structural component of a vehicle wash system that can be easily applied.

It is yet another advantage of the present invention to provide a protective covering for a structural component of a vehicle wash system to minimize corrosion thereof.

In accordance with the above and the other advantages of the present invention, a vehicle wash system having a plurality of vehicle treatment components is provided. One of the plurality of vehicle treatment components includes at least one support member. The at least one support member is constructed of a base material and has an exterior surface. A shrinkable sleeve is sized to fit over the exterior surface of the at least one support member. The shrinkable sleeve is slid onto the at least one support member and located in a predetermined position around the exterior surface. Upon application of heat to the shrinkable sleeve, it shrinks and conforms to the shape of the exterior surface of the at least one support member such that it is fixedly attached to the exterior surface of the at least one support member in the predetermined position. The result is a protective covering for the support member that is durable and readily cleanable such that fluid and debris can be easily wiped off of the protective covering and corrosion of the support member is minimized.

The present invention also includes a method of applying a protective covering to at least one support member of a structural component in a vehicle wash system. The method includes providing a shrinkable sleeve of a predetermined color that is sized to fit around the at least one support member. The shrinkable sleeve is then disposed over the at least one support member and positioned around the exterior surface in a predetermined location. The shrinkable sleeve is then heated causing it to shrink and conform to the surface of the at least one support member. Once shrunk, the sleeve is fixedly secured to the at least one support member such that it has a protective covering, which protects the base material from exposure to the elements.

These and other features and advantages of the present invention will become apparent to one of ordinary skill in the art from the following description of the invention, when viewed in accordance with the accompanying drawings and appended claims.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

The present invention is intended for use in a vehicle washing system, as will be understood by one of ordinary skill in the art. It will also be understood by one of ordinary skill in the art, however, that the disclosed invention can be utilized in or applied to a variety of other applications.

Referring to the Figures, wherein like numerals indicate corresponding parts throughout the several views, a vehicle wash system is generally shown. As will be understood, the vehicle wash system includes a plurality of vehicle treatment components, such as a cloth roll, a top wheel, a rinse manifold, a friction curtain and/or a dryer to which the present invention can be applied. Obviously, the present invention can also be utilized with a multitude of other types of vehicle treatment components. Each of the vehicle treatment components includes a plurality of support members that are subjected to various fluids, such as water and chemicals, as well as dirt and debris during a vehicle cleaning process. The support members of each of these vehicle treatment components are typically constructed of a corrosive base material, such as a metal. However, the support members could alternatively be formed of other materials known in the art. In many instances, the support members are unpainted or painted a particular color. Some of the vehicle treatment components include a plurality of side support members that are spaced apart. It will be appreciated that the support members can have an almost unlimited number of shapes. For example, they may be elongated or short. They may alternatively be wide or narrow. Additionally, they may have non-uniform exteriors or may be made of multiple pieces. The configuration of the support members is not critical.

The present invention relates to a mechanism for covering and protecting the plurality of support members to prevent corrosion, to assist in their cleaning, and to improve aesthetics. For purposes of illustration, a plurality of generic support members, are shown and described. However, it will be appreciated that the present invention applies equally to the support members for any vehicle treatment component in a vehicle washing system, as discussed above. The present invention can also be used for other structures in a vehicle wash facility, such as signs or the like. It will also be understood that the present invention can be utilized for structures in other applications besides vehicle washing processes.

Figure 1:
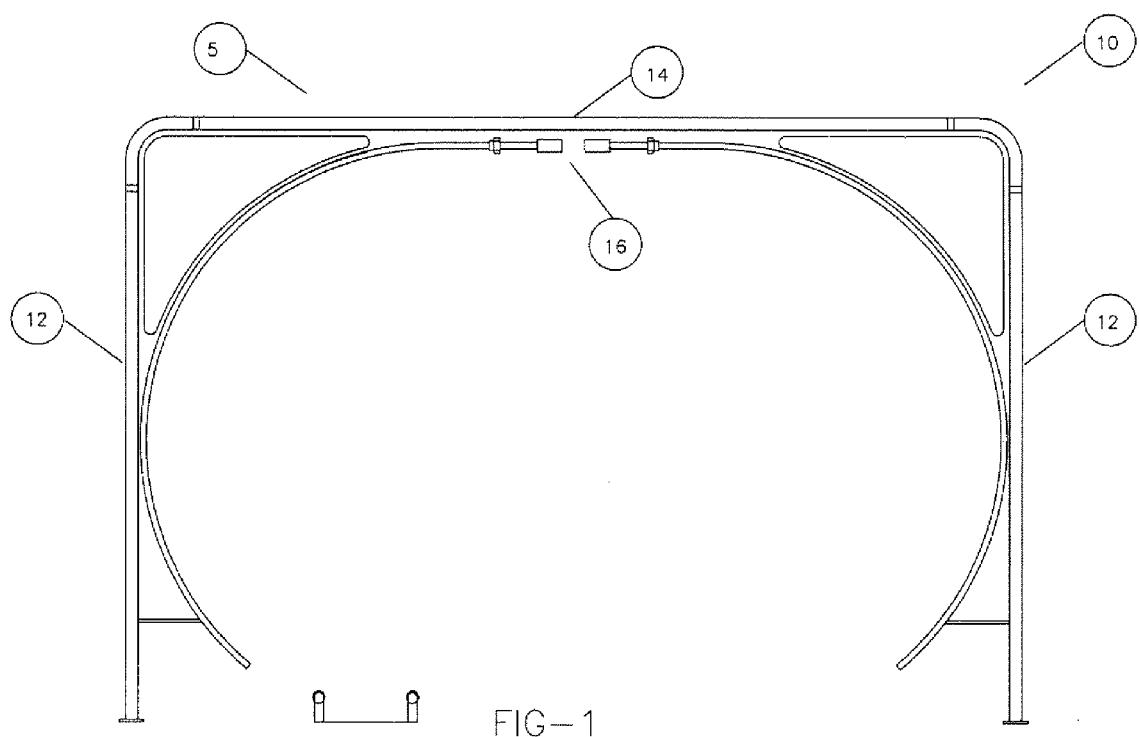
FIG. 1 is a schematic illustration of a vehicle treatment component of a vehicle wash system having a plurality of support members with a protective covering sleeve being disposed around the plurality of support members in accordance with a preferred embodiment of the present invention.

Referring now to FIG. 1, which schematically illustrates a vehicle treatment component 10. The vehicle treatment component 10 is preferably incorporated in a vehicle wash system that can be housed in a vehicle wash facility. The system also includes a plurality of other vehicle treatment components. It will be appreciated that the vehicle wash system can be a tunnel wash, a roll over system, or any other suitable vehicle washing system. As shown, the exemplary vehicle wash system , includes a vehicle treatment component 10 having a pair of opposing side support legs 12 and an overhead support beam 14. The overhead support beam 14 preferably has a vehicle treatment device 16 secured thereto. The pair of side support legs 12 and the overhead support beam 14 are preferably constructed of a metal material, which can corrode when subjected to the environment or conditions of a vehicle wash system, which are readily known. It will be understood that the side support legs 12 and the overhead support beam 14 can be constructed of a variety of other suitable materials.

In this embodiment, the vehicle travels through the vehicle wash system beneath the overhead support beam 14, such that it is subjected to the vehicle treatment device 16. The vehicle treatment device 16 can be any suitable device, such as a dryer, brush, cloth drape, etc. Additionally, the vehicle treatment component 10 can be configured in a variety of other suitable ways. For example, the vehicle treatment apparatus 10 may have more or less side support legs 12 and more or less overhead support beams 14. Further, the vehicle treatment device 16 could be positioned to contact a side portion of a vehicle.

Figure 2:
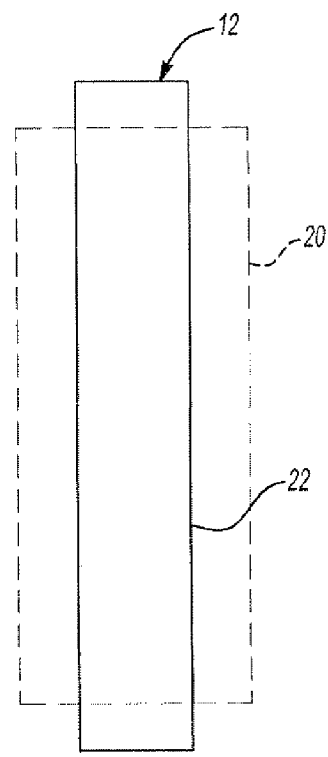
FIG. 2 is a schematic illustration of a support member for a vehicle treatment component of a vehicle wash system with a protective covering disposed therearound in accordance with a preferred embodiment of the present invention.

FIG. 2 illustrates the structure and method for covering a support member in accordance with the present invention. As discussed above, the structure and method can be applied to any component of a vehicle treatment apparatus or a variety of other structures, including in other applications. The structure and method is discussed in connection with a side support leg 12 for exemplary purposes only. As shown, the side support leg 12 includes a protective covering 20 that is sized to fit over the exterior thereof. The protective covering 20 is preferably constructed of a plastic material. However, the protective covering 20 can be formed of a variety of other suitable materials. Additionally, the protective covering 20 is preferably configured as a sleeve that can slide over the side support leg 12. Alternatively, the protective covering 20 can take on a variety of other shapes or configurations. As can be seen in FIG. 2, the protective covering 20 has a size that is larger than the perimeter of the exterior surface 22 of the side support leg 12. Further, the protective covering 20 is preferably positioned around the portions of the side support leg 12 that are intended to be protected. For example, the protective covering 20 can cover the entire support leg 12 or substantially the entirety of the side support leg 12. Additionally, more than one protective covering 20 can be placed around the side support leg 12 to cover the exterior surface 22.

Figure 3:
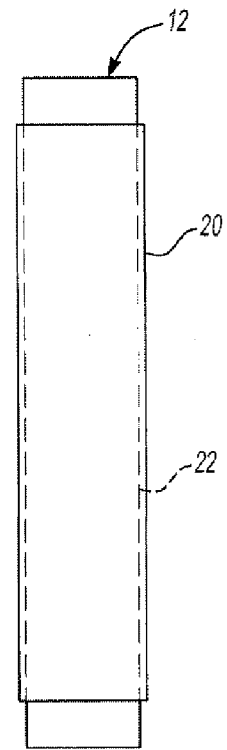
FIG. 3 is a schematic illustration of a support member for a vehicle treatment component of a vehicle wash system with a protective covering fixedly secured thereto in accordance with a preferred embodiment of the present invention.

Once the protective covering 20 has been disposed around the portions of the side support leg 12 that are intended to be protected, heat is applied to the protective covering 20. Heat can be applied in a variety of known ways, as will be appreciated by one of ordinary skill in the art. Due to the application of heat, the protective covering 20 shrinks such that it conforms to the exterior surface 22 of the side support leg 12 thereby serving as a protective covering therefore. In other words, as shown in FIG. 3, the protective covering 20 shrinks and becomes coupled to the exterior surface 22 of the side support leg 12 and is then an integral part thereof. While the protective covering 20 is constructed of a plastic material, it can be formed from a variety of other suitable materials that will shrink. Alternatively, the protective covering 20 can be constructed of an elastic material or other material that can slide over the support leg 12, remain attached without any coupling mechanism, and provide sufficient fit and protection from corrosion for the side support leg 12.

Figure 4:
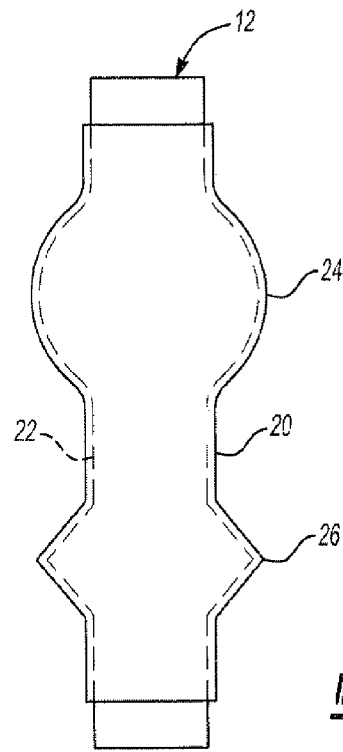
FIG. 4 is a schematic illustration of a support member for a vehicle treatment component of a vehicle wash system with a protective covering fixedly secured thereto in accordance with another preferred embodiment of the present invention.

FIG. 4 illustrates another embodiment of the application and benefits of the protective coating 20 of the present invention. As shown in FIG. 4, the side support leg 12 has a non-uniform exterior. For example, in this embodiment, the side support leg 12 includes a bulb 24 and a barb 26 that are part of the exterior surface 22 of the side support leg 12. The method of the application of the protective coating 20 is the same as in FIG. 3. Specifically, the protective coating 20 is disposed around the side support leg 12 and positioned in the appropriate location therearound. Once the protective coating 20 is located in the proper position, it is subjected to heat causing it to shrink. As the protective coating 20 shrinks, it conforms to the exterior surface 22 of the support leg including following the shape of the bulb 24 and the barb 26. Obviously, the side support leg 12 can have a variety of other protrusions or non-uniformities and these are merely intended for illustration purposes.

It will also be understood that the protective covering 20 can be formed of any of a variety of colors. This allows the owner or operator of a vehicle washing system to install vehicle treatment component 10 that is colored in a desired manner, such as for branding purposes and/or marketing purposes. Further, the protective covering 20 can be easily cleaned to keep it attractive without significant labor. Additionally, the protective covering 20 is durable and will not corrode, which eliminates the need to replace or repair portions of the support leg. Further, a second protective covering 20 can be placed or disposed over the first protective covering 20, to allow for multiple colors on a single support structure of to allow for different aesthetic appearances.

However, it will be appreciated that the protective covering 20 can have a multitude of different sizes, shapes, configurations, and lengths to match the dimensions of the support member it is intended to cover. The protective covering 20 is intended to cover all of the exterior surface 22 of the support member 12. However, it can be configured to cover less than all of the support member 22 as desired.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A vehicle wash component, comprising:
at least one support member constructed of a base material and having an exterior surface;
said at least one support member being located in a vehicle wash facility adjacent a vehicle treatment area such that it is exposed to fluid and debris in a vehicle wash facility, including water, soap, wax and/or cleaning chemicals;
a protective covering portion having an inner surface and an outer surface and configured as a sleeve and sized to fit over said exterior surface of said at least one support member; said protective covering portion formed of a material that is configured to shrink and conform to said exterior surface of said at least one support member, said protective covering portion being formed of a readily cleanable material;
whereby said protective covering portion is configured such that after it has shrunk and the entirety of said inner surface has conformed to said exterior surface it appears as an integral part of said at least one support member and covers a substantial portion of said at least one support member to prevent fluid and debris within said vehicle wash facility from contacting said substantial portion of said at least one support member.

2. The component of claim 1, wherein said base material is metal.

3. The component of claim 1, wherein said protective covering portion is constructed from one of a variety of different colors.

4. The component of claim 1, wherein said protective covering portion shrinks to conform to said exterior surface of said at least one support member upon application of heat.

5. The component of claim 1, further comprising: a plurality of support members being spaced apart from one another.

6. The component of claim 5, further including a second protective covering portion that is configured as a sleeve and sized to fit over said exterior surface of another of said plurality of support members.

7. The component of claim 1, wherein said protective covering portion overlies substantially the entirety of said at least one support member.

8. The component of claim 1, wherein said protective covering portion is formed of a plastic material.

9. A vehicle wash component, comprising:
at least one support member constructed of a base material that is susceptible to corrosion and having an exterior surface;
said at least one support member being located in a vehicle wash facility adjacent a vehicle treatment area such that it is exposed to fluid and debris in a vehicle wash facility, including water, soap, wax and/or cleaning chemicals;
a protective covering portion having an inner surface and an outer surface and configured as a sleeve and sized to fit over said exterior surface of said at least one support member, said protective covering portion formed of a material that is configured to shrink and conform to said exterior surface of said at least one support member;
whereby said protective covering portion is configured such that after it has shrunk, a top end and a bottom end of said protective covering portion conform to said exterior surface of said at least one support member to prevent fluid and debris from contacting said exterior surface of said at least one support member disposed underneath said outer surface of said protective covering.

10. The component of claim 9, wherein said at least one support member is formed of a metal material.

11. The component of claim 9, wherein said protective covering portion is constructed from one of a variety of different colors.

12. The component of claim 9, wherein said protective covering portion shrinks to conform to said exterior surface of said at least one support member upon application of heat.

13. The component of claim 9, further comprising:
a plurality of support members being spaced apart from one another.

14. The component of claim 13, further including a second protective covering portion that is configured as a sleeve and sized to fit over said exterior surface of another of said plurality of support members.

15. The component of claim 9, wherein said protective covering portion overlies substantially the entirety of said at least one support member.

16. The component of claim 9, wherein said protective covering portion is formed of a plastic material.

* * * * *